(12) United States Patent
McCoy et al.

(10) Patent No.: US 9,118,712 B2
(45) Date of Patent: Aug. 25, 2015

(54) NETWORK COMMUNICATION SYSTEM WITH IMPROVED SECURITY

(75) Inventors: Joseph McCoy, Frankfort, NY (US); Joshua White, Ilion, NY (US)

(73) Assignee: Everis, Inc., Frankfort, NY (US)

( * ) Notice: Subject to any disclaimer, the term of this patent is extended or adjusted under 35 U.S.C. 154(b) by 229 days.

(21) Appl. No.: 12/982,504

(22) Filed: Dec. 30, 2010

(65) Prior Publication Data

US 2012/0174218 A1  Jul. 5, 2012

(51) Int. Cl.
*G06F 11/00* (2006.01)
*H04L 29/06* (2006.01)

(52) U.S. Cl.
CPC ........ *H04L 63/1441* (2013.01); *H04L 63/0281* (2013.01); *H04L 63/168* (2013.01)

(58) Field of Classification Search
USPC ........................................................ 726/1–22
See application file for complete search history.

(56) References Cited

U.S. PATENT DOCUMENTS

| 7,823,208 | B2 * | 10/2010 | DeMello et al. ................. 726/26 |
| 7,979,700 | B2 * | 7/2011 | Elazar et al. ................... 713/165 |
| 8,196,205 | B2 * | 6/2012 | Gribble et al. ................... 726/24 |
| 2002/0032770 | A1 | 3/2002 | Fertell et al. |
| 2002/0162008 | A1 | 10/2002 | Hill |
| 2003/0005072 | A1 | 1/2003 | Olah et al. |
| 2003/0182399 | A1 | 9/2003 | Silber |
| 2003/0208558 | A1 | 11/2003 | Venkatraman et al. |
| 2004/0210773 | A1 | 10/2004 | Markosi, III |
| 2005/0086255 | A1 | 4/2005 | Schran et al. |
| 2005/0132046 | A1 | 6/2005 | de la Iglesia et al. |
| 2005/0251693 | A1 * | 11/2005 | Shevchenko .................. 713/193 |
| 2006/0045082 | A1 | 3/2006 | Fertell et al. |
| 2006/0212933 | A1 | 9/2006 | Scoggins et al. |
| 2007/0150685 | A1 | 6/2007 | Shevchenko |
| 2007/0206741 | A1 | 9/2007 | Tiliks et al. |
| 2008/0022386 | A1 | 1/2008 | Shevchenko |
| 2008/0162135 | A1 | 7/2008 | Claudatos et al. |
| 2008/0320594 | A1 | 12/2008 | Jiang |

(Continued)

OTHER PUBLICATIONS http://www.invincea.com/ (including all linked pages and/or pdf files) as of Sep. 3, 2010.

(Continued)

*Primary Examiner* — Kaveh Abrishamkar
*Assistant Examiner* — Tri Tran
(74) *Attorney, Agent, or Firm* — Frederick J.M. Price; George R. McGuire; Bond Schoeneck & King, PLLC

(57) ABSTRACT

A computer network communication method and system wherein software rendering software is interposed in the data communication path between a browser running on a user computer and the internet data sources (for example, internet-accessible server computers) that the user browser wants to receive information from. The software rendering application gets data from internet data sources, but this data may contain malware. To provide enhanced security, the software rendering application renders this data to form a new browser readable code set (for example, an xml page with CSS layers), and this new and safe browser readable code set is sent along to the browser on the user computer for appropriate presentation to the user. As part of the rendering process, dedicated and distinct virtual machines may be used to render certain portion of the data, such as executable code. These virtual machines may be watched, and quickly destroyed if it is detected that they have encountered some type of malware.

20 Claims, 6 Drawing Sheets

(56) References Cited

U.S. PATENT DOCUMENTS

| | | |
|---|---|---|
| 2009/0044265 A1 | 2/2009 | Ghosh et al. |
| 2009/0125954 A1 | 5/2009 | Ku |
| 2009/0207751 A1 | 8/2009 | Attanasio et al. |
| 2009/0240684 A1* | 9/2009 | Newell et al. .................... 707/5 |
| 2009/0252151 A1 | 10/2009 | Rappe |
| 2009/0253423 A1 | 10/2009 | Kullberg |
| 2009/0307571 A1 | 12/2009 | Gowda et al. |
| 2009/0307603 A1 | 12/2009 | Gowda et al. |
| 2010/0122343 A1 | 5/2010 | Ghosh et al. |
| 2010/0146301 A1 | 6/2010 | Shevchenko et al. |
| 2010/0312876 A1 | 12/2010 | Sim et al. |
| 2012/0022942 A1* | 1/2012 | Holloway et al. .......... 705/14.49 |
| 2012/0117649 A1* | 5/2012 | Holloway et al. ................ 726/24 |

OTHER PUBLICATIONS

U.S. Appl. No. 12/813,193, filed Jun. 10, 2010.

* cited by examiner

NETWORK COMMUNICATION SYSTEM WITH IMPROVED SECURITY

FEDERALLY SPONSORED RESEARCH OR DEVELOPMENT

There may be U.S. government rights in this application and/or any ensuing patent(s) because this application may have been funded in part by one or more of the following grants: (i) U.S. Air Force contract number FA8750-08-C-0261.

BACKGROUND OF THE INVENTION

1. Field of the Invention

The present invention is directed to two way communication over a network (such as the internet), and more particularly to the type of two way network communication that is commonly referred to as "surfing the web," and even more particularly to prevention of: (i) receipt of malware (see DEFINITIONS section); and/or (ii) adverse consequences arising from the receipt of malware.

2. Description of the Related Art

The need for connection and interacting with the internet has become part of the way businesses, households, academia, governments and individuals conduct business, provide information, educate and derive entertainment. Unfortunately, the shared nature of its make-up and anonymity inherent also provide the basis for malicious activity that invades privacy, steals information and increases risk of liability for information loss. Sophisticated "hacking" practices generally are exercised and delivered to the victim via internet browsing which also includes the visiting of legitimate web sites that have been compromised to allow the transmittal of malware to the visitor's internet connected computer. Current practice for malware protection generally takes the form of anti-virus programs and malware scanners to keep computers and other internet connected systems protected. These include host based software and in-line devices.

Engaging in network communication by surfing the web is a relatively new form of communication, but it has become very, very popular in a relatively short time. When surfing the web, users use browser software, sometimes equipped with plug-ins to send and receive text, images, emails, files (for example, video files, audio files, zipped files), streaming video, streaming audio, communications with remote server-hosted software (like Flash), and so on. Users commonly send data up to remote server computers so that it can be accessed and enjoyed by others. Making a blog entry on blogging software is an example of that. Users generally receive data over the internet, and through their browsers, in the form of web pages, such as xml formatted web pages.

The browsers, and their plug-ins, are increasingly robust in the sense that they can handle many different types of data and/or executable code. This makes for a richer user experience when surfing the web, and is probably a large part of the reason that the internet continues to increase in popularity with regular folks. Besides browsers on traditional computers (like mainframes, desktops and laptops), browsers are now coming to other "computer" devices, like personal digital assistants and smartphones. In the future, browsers may be built into even smaller devices, like eyeglasses or implants or household appliances.

However, with the increased popularity and robustness of browser software comes increased risk of malicious code, which is commonly referred to as malware (see DEFINITIONS section). It also makes it more difficult to control the communications of people's who's communications need some measure of oversight and control, such as young students, people on probation, suspected terrorists or military personnel near a combat zone.

US patent application ("USPA") 2005/0251693 ("693 Shevchenko") discloses a system used for computer network communication that strives to protect user's computers from unauthorized access. The system of 693 Shevchenko includes: a protected computer 8 (references to reference numerals in this paragraph refer to 693 Shevchenko); a display 7; an output switch 6; and an external unit 1,2,3,4,5,10. In operation, The external unit 1,2,3,4,5,10 communicates directly with a computer network, like the internet. It is believed that 693 Shevchenko contemplates that these communications may take the form of HTML coded webpages, and associated data communicated in HTTP protocols to/from the internet. While 693 Shevchenko does not mention the work "browser," it is believed that 693 Shevchenko would teach or suggest to one of ordinary skill that external unit 1,2,3,4,5,10 would typically include a browser in implementations where the "external communications link" (see 693 Shevchenko at FIG. 1) was a link to the internet. Regardless, of whether external unit 1,2,3,4,5,10 of 693 Shevchenko is ultimately considered to effectively teach a browser communication with the internet, it is clear external unit 1,2,3,4,5,10 of 693 Shevchenko converts its incoming network communications into the form of frames before sending them to protected computer 8 through the mechanism of switch 6. These frames basically represent visual displays. They are one form of "rendered images" or "bitmaps." In this way, the protected computer 8 of 693 Shevchenko is protected from malware. Specifically, because the protected computer receives only frames, and not more complex code, such as HTML web page code, the protected computer will not tend to receive malware because the data it gets simply represents the pixels of a visual display, rather than executable instructions that could take the protected computer in bad and difficult-to-prospectively-predict directions. The rendered images of the frames of 693 Shevchenko include malware in the sense that they could cause unwanted displays, such as a display of unrequested pornography. Nevertheless, the result of the unintended code, on protected computer 8, will be limited to the visual display of an unintended image, and not something more serious like an infectious and self-replicating computer virus.

USPA 2009/0307571 ("571 Gowda") discloses a computer system for displaying images from the internet on what 571 Gowda calls a "static display device." The static display device of Gowda may take the form of a digital picture frame, and, more generally, is a device with just enough processing power, storage and/or memory to store and display rendered images (which 571 Gowda calls static image files). As shown in FIG. 1 of 571 Gowda, the 571 Gowda system includes: internet/web 118 (reference numerals in this paragraph make reference to the Figures of 571 Gowda); image service 110; static display device 102; and user computer 106. Internet/web 118 includes servers that have HTML web pages which include image(s) in the web page. In operational aspects relevant for present purposes, the image service 110 requests, by URL, an HTML web page as directed by the user computer 106. When internet/web 118 delivers the requested HTML web page to image service 110, the image service extracts one or more rendered images from the HTML web page. The image service then sends these rendered images, without the rest of the HTML page, to static display device 102. Static display device 102 stores and displays the image for enjoyment by viewers (for example, viewers of a digital picture frame hanging on a wall in a home). Things to note regarding 571 Gowda are as follows: (i) the static display devices that receives the extracted rendered image does not have a browser and does not receive the rendered images from the image service in a browser; (ii) the static display device does not request web pages from a browser (but rather user computer 106 specifies which images are to be sent to the static display device that receives the rendered images from the image service); (iii) the static display device does not render new images based on HTML pages, but merely removes images that are already rendered and present within the HTML page from the HTML page before forwarding them along to the static display device; and (iv) a user of the static display device cannot interact with the displayed image and cannot use the rendered image as a basis for further interactive network communications (that is, the viewer of the static display device does not use the images displayed there to surf the web).

The website at http://www.invincea.com/ (including all linked pages and/or pdf files) as of Sep. 3, 2010 deals with software that can be used in a computer to protect that computer against malware. For example, on a web page entitled "Invincea™ Browser protection enables users to knock out sophisticated Web-borne treats—in real time" includes the following disclosure: "Invincea™ Browser Protection shields PC users against all types of Web-borne threats by seamlessly moving desktop Web browsers into a controlled virtual environment. Exceptional Protection: Invincea provides a fully isolated browser environment to maximize PC protection. It automatically detects and terminates a threat in real time, disposes of the tainted environment, and restarts a pristine one. Signature-Free Detection: Unlike other solutions, Invincea does not rely on malware signatures for detection, nor does it rely on users to make correct security decisions. Instead, it automatically identifies malware attacks based on behaviors and actions inside a controlled environment." This disclosure is understood to mean that: (i) the Invincea™ system sets up a virtual machine or virtual process to receive and process communications received over a network; (ii) upon the detection of some abnormal condition (indicative of malware) within the virtual machine or virtual process the system flips the virtual machine; and (iii) this flipping of the virtual machine or virtual process reduces or eliminates the unintended affects of any malware which may have present in the network communication received by the virtual machine or virtual process.

Other published documents which may be of interest may include the following: (-i) USPA 2003/0208558 ("Venkataraman"); (ii) USPA 2009/0307603 ("603 Gowda"); (iii) USPA 2007/0150685 ("685 Shevchenko"); (iv) USPA 2008/0022386 ("386 Shevchenko"); (v) USPA 2010/0146301 ("301 Shevchenko"); (vi) USPA 2010/0122343 ("343 Ghosh"); and/or (vii) USPA 2009/0044265 ("265 Ghosh").

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

One aspect of the present invention recognizes that conventional anti-virus modules (that is, hardware and/or software) are not always effective to provide sufficient security. The notion of placing additional anti-virus software onto the user's computer does not address the fact that sophisticated hacks that place themselves at low levels of the computer architecture, thereby evading the protection software that may be resident at higher levels. Placing an inline device that is self protecting and then filters based on pattern knowledge or "checking" by testing for unwanted effects on its secure state incurs additional expense and often requires the addition of "communication software" onto the object of protection. Further and isolated in-line device which rolls back to a fresh image of its protected state upon detection of state change is subject to a targeted denial of service attack. This attack would effectively shut down the targets internet connection capability.

This aspect of the present invention further recognizes the trend to "thin client" architecture which endeavors to reduce the complexity, cost and vulnerabilities of a computer device by remotely hosting (or evoking the service on demand) the applications a client computer calls. Such services include typical office programs, data storage and virtual meetings. Example of this trend are Google's and Amazon's hosted services. Further, that such services exit within a "cloud" computing environment versus being physically present as code on a user's "client" computer. In this fashion, the end user ultimately has only one program on the client computer. Benefits of homogeneity across an enterprise, user base and individual machines include reduced technical support, reduced vulnerability and overall reduced cost of ownership.

This method of protecting an end user while connected to the internet addresses a current need for safe web browsing and further supports "trusted thin client" by the fact the that a web browser program will generally the main program of operation and therefore remain the vulnerable point of entry for malware. The method preferably includes a remote software based process that upon connection to, emulates the web to browser interaction so as to render the incoming web pages and forms an interactive pixel image that is void of any original code.

The present invention is directed to a security module that is remote from the user computers which it protects, and from the server computers that serve requested (and potentially security-compromised) data to the user computers. The security module receives an initial state browser readable code set (see DEFINITIONS section) from a server, which initial state browser readable code set has been requested, and is intended for the browser module of a user computer. The security module renders and/or recontainerizes (see DEFINITIONS section) at least a portion of the initial state browser readable code set to produce a rendered and/or recontainerized browser readable code set. The security module then sends the rendered and/or recontainerized browser readable code set to the browser of the appropriate user computer. Preferable, the browser readable code sets are in the form of xml pages with standard CSS layering. preferable, at least substantially the entire initial state browser readable code set is rendered and/or recontainerized by the security module.

Another aspect of the present invention relates to protection from malware by flipping (see DEFINITIONS section) a virtual machine (see DEFINITIONS section). According to this aspect of the present invention, the flipping is not triggered by detection of an abnormal condition (see above discussion of the Invincea system), but rather is triggered by some condition (or conditions) that are expected to occur during normal network communication operations. The normal operating condition (or conditions) used to trigger a flip may be: (i) based on operational state of the flow (for example, a TCIP session ends and a new one begins); or (ii) not based on the operational state of the flow (for example, passage of a predetermined time period since the last flip).

Preferably, at least some of the flip triggering conditions are based on operational state of the flow characteristics. Also, systems according to this aspect of the present invention may have different security levels, wherein different sets of normal operating conditions will trigger a flip, with higher security levels generally flipping more often (due to an increase in the number of normal operating conditions that will cause a flip and/or to the use of conditions that tend to occur more frequently during normal network communication operations).

A method connects user browser software running on a user computer to the internet for the purposes of data communication with internet data sources. The method includes the follow steps (not necessarily in the following order unless required or affirmatively indicated): (a) providing a software rendering application that is: (i) remote from the user computer, and (ii) in data communication with the user computer; (b) issuing at least one command from the user browser software, the at least one command being intended for a target internet data source internet data sources; (c) intercepting, by the software rendering application, the at least one command before it reaches the target internet data source; (d) proxying, by the software rendering application, the at least one command; (e) receiving, by the software rendering application, responsive data through the internet from the target internet data source; (f) rendering, by the software rendering application, the responsive data into a pixilated image defined by pixilated image data; (g) encapsulating, by the software rendering application, the pixilated image data into a browser readable code set; and (h) sending the browser readable code set from the software rendering application to the user browser software.

A security module for use in a computer communication system includes a communication network, a server computer sub-system and a user computer sub-system that includes a user browser module. The security module includes: a receive non-secure browser readable code set sub-module; a render and/or recontainerize sub-module; and a send secure browser readable code set sub-module. The receive non-secure browser readable code set sub-module is structured, connected and/or programmed to receive a non-secure browser readable code set from the server computer sub-system which is intended for the user computer browser module. The render and/or recontainerize sub-module is structured, programmed and/or connected to render and/or recontainerize at least a substantial portion of the non-secure browser readable code set to form a secure browser readable code set corresponding to the non-secure browser readable code set. The send secure browser readable code set sub-module that is structured, programmed and/or connected to send the secure browser readable code set to the user browser module. The security module is remote from the server computer sub-system. The security module is remote from the user computer sub-system.

A method receives and processes communications by a computer system. The method includes the following steps (not necessarily in the following order unless required and/or affirmatively indicated): (a) determining, by the computer system, a set of flip condition(s) comprising at least a first flip condition; (b) setting up a first virtual machine running on the computer system; (c) setting up a second virtual machine running on the computer system; (d) receiving, by the computer system, a plurality of network communications from at least one remote machine over a communication network; (e) processing, by the first virtual machine, at least some of the network communications received at the receiving step; (f) evaluating whether any flip condition(s) in the set of flip condition(s) have been met; (g) flipping the first virtual machine to a second virtual machine on condition that it is determined that at least one flip condition is met at the evaluating step. The first flipping condition is likely to occur during normal network communication operations and is not an indication that indicates anything abnormal in the operation of the virtual machine.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
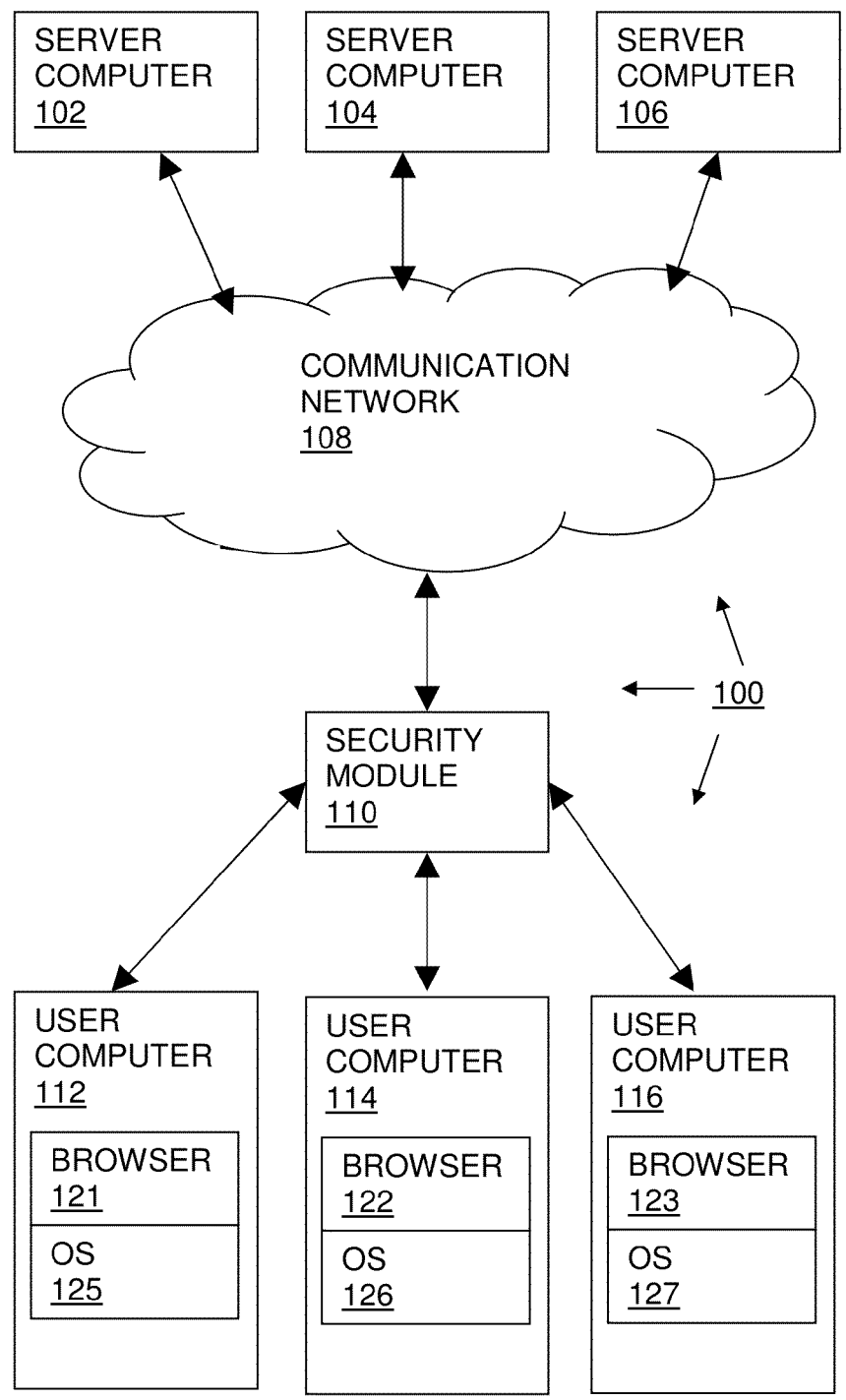
FIG. 1 is a schematic view of a first embodiment of a computer network communication system according to the resent invention.
Figure 2:
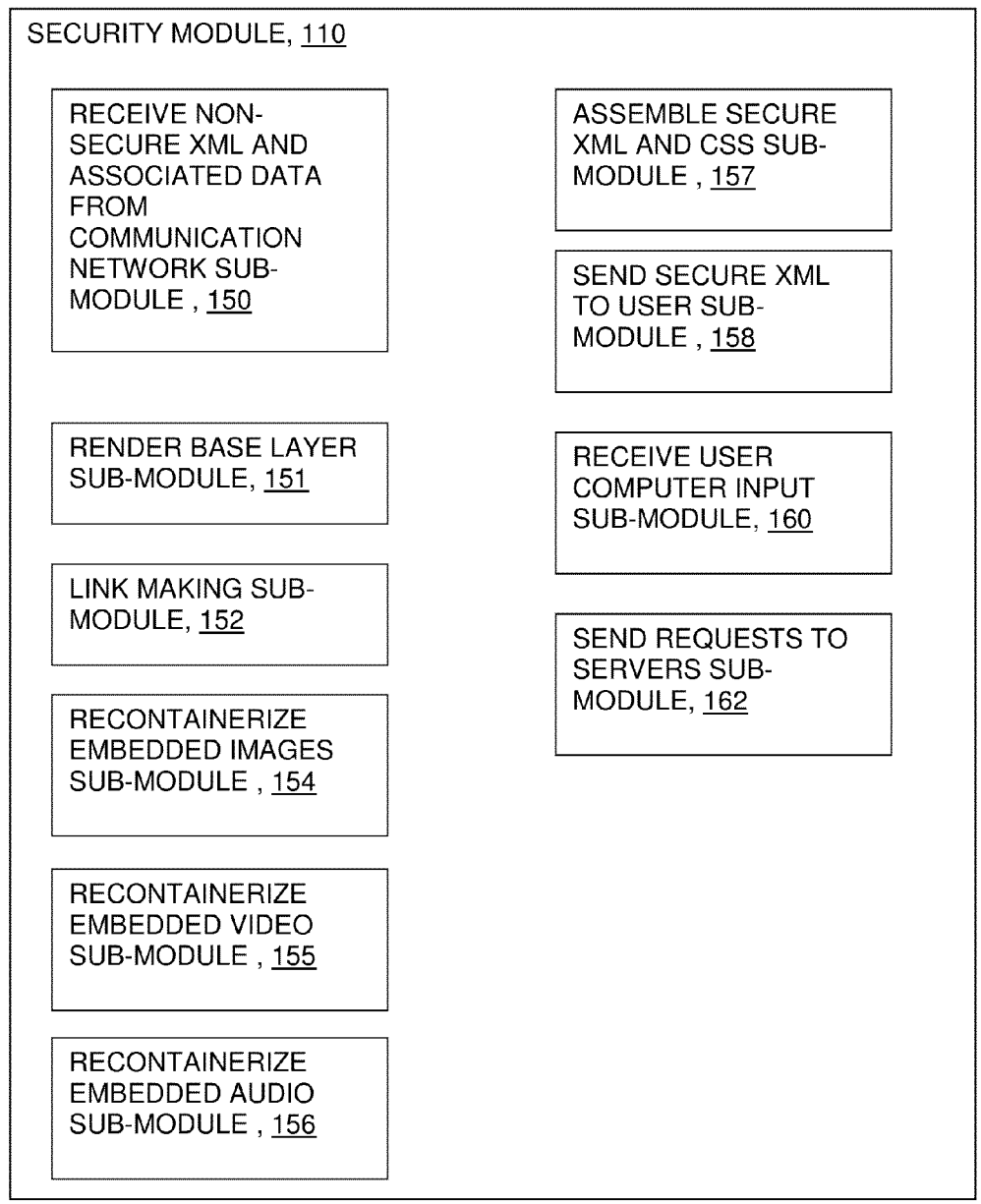
FIG. 2 is a schematic view of the security module component of the first embodiment system.

FIG. 1 shows computer network communication system 100 including: first server computer 102; second server computer 104; third server computer 106; communication network 108; security module 110; first user computer 112; second user computer 114; third user computer 116; browser modules 121,122,123; and operating system modules 125, 126,127. As shown in FIG. 2, security module 110 includes: receive non-secure xml and associated data from communication network sub-module 150; render base layer sub-module 151; link making sub-module 152; recontainerize embedded images sub-module 154; recontainerize embedded video sub-module 155; recontainerize embedded audio sub-module 156; assemble secure xml and css sub-module 157; send secure xml to user sub-module 158; receive user computer input sub-module 160; and send requests to servers sub-module 162.

In operation, the users of the user computers 112,114,116 want to surf the web in a secure manner, meaning primarily that they want to view and interact with webpages hosted on the server computers 102,104,106 over network 108. Network 108 preferably includes the internet, but: (i) it may also include other networks (of types now known or to be developed in the future; and (ii) network 108 does not necessarily include the internet. The communications delivered by the servers are delivered in browser readable code (see DEFINITIONS section). Currently, the most popular form of browser readable code is based around xml web pages and associated data, but other forms of browser readable code, to which the present invention may be applicable, may arise in the future. However, browser readable code may contain malware, such as instructions for the user's browser to request undesired web pages, to download unwanted data and/or to perform unwanted processing operations by the user's computer. Browser readable code is much more susceptible to malware than is a rendered image. For example, xml web page code is much more susceptible to malware that, say, an image file in jpg format. Still, servers generally serve up browser readable code, and that is generally what users want to see, because of the improved opportunities for interactivity and dynamic data (for example, video or moving images) that browser readable code allows and rendered images generally do not.

In system 100, the users of the user computers preferably receive good quality and functional facsimiles of the browser readable code that they want to receive and interact with, but they get their data in a more secure manner, with a greatly reduced possibility of receiving malware. These advantages are accomplished by security module 110 which will now be discussed in detail.

First, one of the browsers of one of the user computers sends a request to sub-module 160 of the security module. In this embodiment, the request that is sent is actually a direct URL request formatted exactly as if the browser were communicating with the internet servers 102,104,106, without the security module acting as an intermediary. In other words, the browsers of the user computers "think" the are communicating directly with servers through the internet, and these browsers, and the rest of the user's computer, do not need to be modified in order to enjoy the security of the security module. However, the communications from the browsers should be routed through the security module before going out to the internet 108, as shown in FIG. 1, so that the security module 110 will receive the user's browser's request instead of the server computer that is addressed in that request. This routing through the security module, as shown in FIG. 1, could be accomplished by a "wired" (for example, fiber optic) data communication connection that is physically connected between the user's computer and the security module, or it could be accomplished by routing a wireless data communication connection through the security module. As will be discussed below, other embodiments of the present invention send requests from the user's computer to the security module through the internet.

Sub-module 160 processes the received request so that the server computer will respond back to the security module. In some preferred embodiments, the security module may process the received request so that any response from the browser will effectively indicate for which user computer 112,114,116 the server's response is intended. In some embodiments of the present invention, sub-module 160 may perform some kind of filtering and/or screening of the requests sent form the browser of the user computer. For example, if the user is school student who is requesting browser data from inappropriate servers, then that request may be stopped and not passed long, perhaps with notification to the school administrator. Although such filtering is conventional, the security module of the present invention may be an advantageous and novel platform for performing some or all of this screening and/or filtering. After this processing is completed, the request is forwarded along to internet 108 and thence to the appropriate server 102,104,106. The server will respond by sending the requested browser readable code (for example, xml web page) through internet 108 to sub-module 150 of security module 110. As with the outgoing requests discussed above, conventional screening and/or filtering could be performed on the incoming browser readable code, but this is not necessarily required.

Once the browser readable code is received at security module 110, it is rendered and/or recontainerized in order to provide security according to the present invention. Render base layer sub-module 151 renders an image according to the received browser readable code. As a simple and typical example, the browser readable code may be an html web page made up entirely of text and text formatting (for example, margins, colors, fonts, spacing) with no links or images or any other fancy stuff. In this example, the text is rendered as rendered base image (which is basically a pixelated bitmap of a picture of the text). In this simplified example, the rendered base image would be sent to sub-module 157 and recontainerized as a new html page containing pretty much only the rendered base image, and this would be sent to the appropriate user computer browser as if it were a response coming directly from the server. The rendered base image is preferably compressed, for example, as a jpg image file. In this way, if the html code received from the server computer included malware in the html code, this malware would be effectively removed by the processes of rendering the image and recontainerizing it.

Unlike the example of the previous paragraph, most browser readable code sets will include things beyond a rendered base image. For example, sub-module 152 of module 110 handles links and/or fillable user input data fields that may be present in the browser readable code set. Sub-module 154 handles linked or embedded images present in, or associated with, the browser readable code set. Sub-module 155 handles linked or embedded video present in, or associated with, the browser readable code set. Sub-module 156 handles linked or embedded audio present in, or associated with, the browser readable code set. Other sub-modules may be added to handle other kinds of output (to the user) data or expected input (from the user data). It is highly preferable to render and/or recontainerize (see DEFINITIONS section) these additional forms of data. There are two different ways that these additional forms of data may be handled as will be discussed in the following two paragraphs.

A first way of rendering and/or recontainerizing additional data is to include this data in the rendered base image. For example, a rendered image (for example, a jpg image file) that is part of the browser readable code set can be rendered into the rendered base image by co-operation between sub-modules 151 and 154. Even the visual portion of video can be rendered into a series of rendered base images. While associated data can be rendered into the base image, this is not necessarily preferred, as will be discussed in the next paragraph, as it is not really even possible with data types, like user input data fields. However, if compressible image formats are developed in the future that allow metadata (like links) to be rendered directly into something that is still essentially a single layer image file, then it may become preferable in the future to include more and more data types in the rendered base image.

As second way of rendering and/or recontainerizing additional data is to add layers to the rendered base image. In a preferred embodiment of the present invention, the rendered base layer and additional layers as standard CSS layers as is readable by currently conventional browsers. For example, a video layer may be done in HTML5 video format.

In some preferred embodiments, sub-modules 151 to 157 render and recontainerize substantially all the data of the browser readable code set received over the internet. However, this may not necessarily be true of all embodiments of the present invention. As a simple example, a user's computer may be a text only terminal, so that there would not be much point in rendering and/or recontainerizing images, video and/or audio data. While this embodiment would lead to a less rich user experience, it may save on bandwidth and/or hardware costs. In other embodiments, text and/or image recognition techniques may be used to filter objectionable material from the browser readable code set during the rendering and/or recontainerization process.

After sub-modules 151 to 157 have rendered and/or recontainerized the data to form a rendered and/or recontainerized browser readable code set (for example, an xml page with multiple CSS layers), sub-module 158 sends this data to the browser the appropriate user computer, where the browser reads and presents the code set. Because of the rendering and/or recontainerization, the code set will be free of malware despite the fact that it is indeed a browser readable code set which would normally be considered to be susceptible to malware. Security module 110 may be provided with additional sub-modules (not shown) to report, quarantine and/or otherwise handle malware which is discovered during the rendering and/or recontainerization processes.

Figure 3:
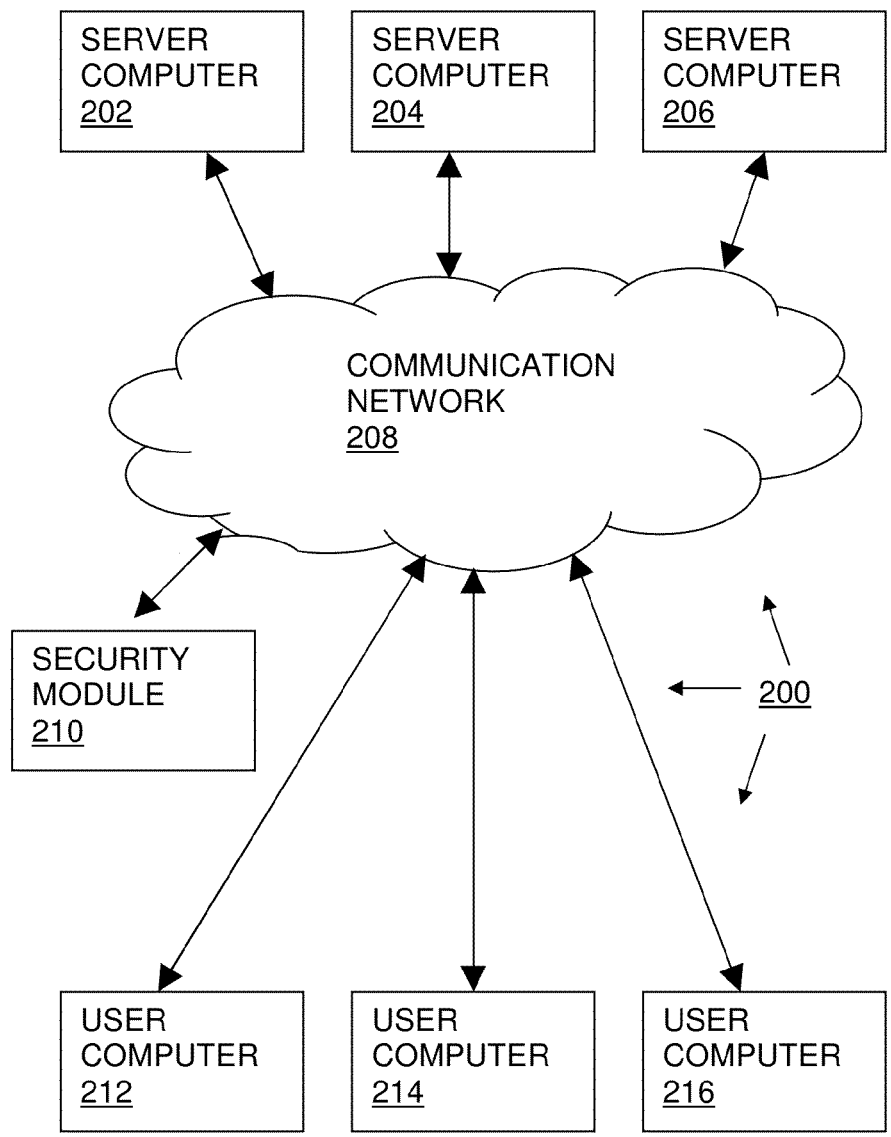
FIG. 3 is a schematic view of a second embodiment of a computer network communication system according to the resent invention.

FIG. 3 shows system 200 including: server computers 202, 204,206; communication network 208; security module 210; and user computers 212,214,216. In this embodiment, the communication network is only connected to the user computers through the communication network, which preferably is, or at least includes, the internet. This means that the user computers must make their requests so that the appropriate server will send its browser readable code set to the security module (for recontainerization and/or rendering), rather than sending the responsive browser readable code set directly back to the user computer. There are two ways of doing this. One way is for the user computer to add information to its browser's request so that the request goes directly to the appropriate server computer (without passing through the security module), but so that the server will direct its response to the security module (rather than the user computer). Another way is for the user's computer to add data to its browser's request so that the request will go first to the security module, and the security module can then effectively forward this request to the appropriate server computer. Of course, under either of these methods, the user's computer must modify the browser request relative to how a conventional browser URL request is made in a conventional system having no security module. This modification may be made by using special browser programmed to implement the present invention, or by other hardware and/or software in the user's computer itself, or even by hardware and/or software in a peripheral device like a telephone line based modem.

An advantage of system 200 is that it does not require special wiring or special wireless communication paths to be created, as all the data communication paths are those that would exist in a conventional system. Another advantage of system 200 is that allows for enhanced opportunities to use distributed and/or cloud computing methods to form the security module and perform the processing of the security module. This may allow for faster data communication and/or less security module hardware and/or software needed to service given number of users.

One variation on systems 100 or 200 will now be mentioned. That is that there may more than one security module so that multiple renderings and/or recontainerizations of the data are performed. This would add additional layers of redundant security. Also, a single security module could perform multiple recontainerizations and/or renderings one after the other.

As a further variation on systems 100 and 200, encryption (for example, secure sockets layer encryption) could be used on communications between the security module and the user computers.

As a further variation, the rendered and/or recontainerized browser readable code sets (or at least portions of them) could be sent for review and/or storage for auditing and/or forensics purposes.

Figure 4:
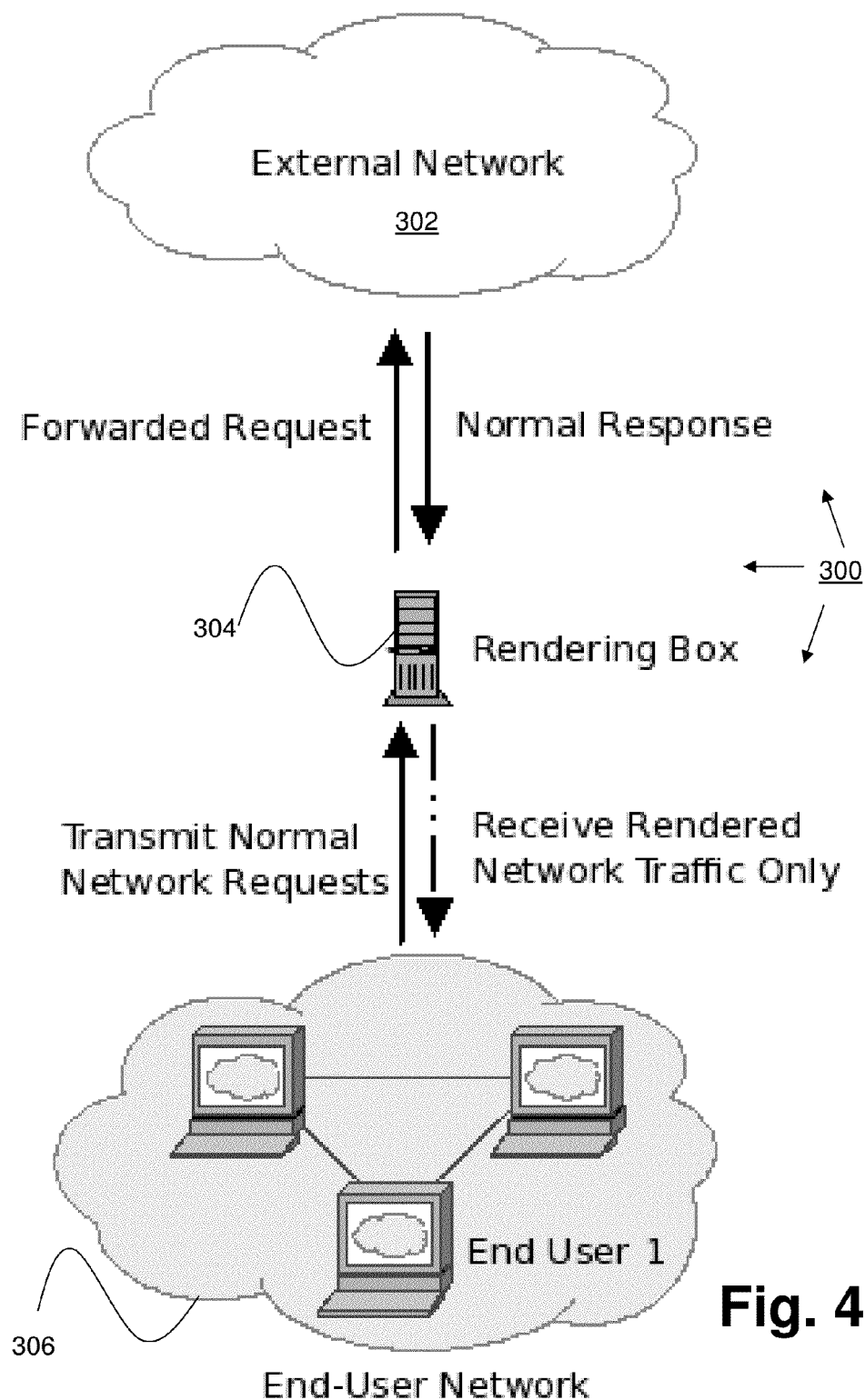
FIG. 4 is a schematic view of a third embodiment of a computer network communication according to the resent invention.
Figure 5:
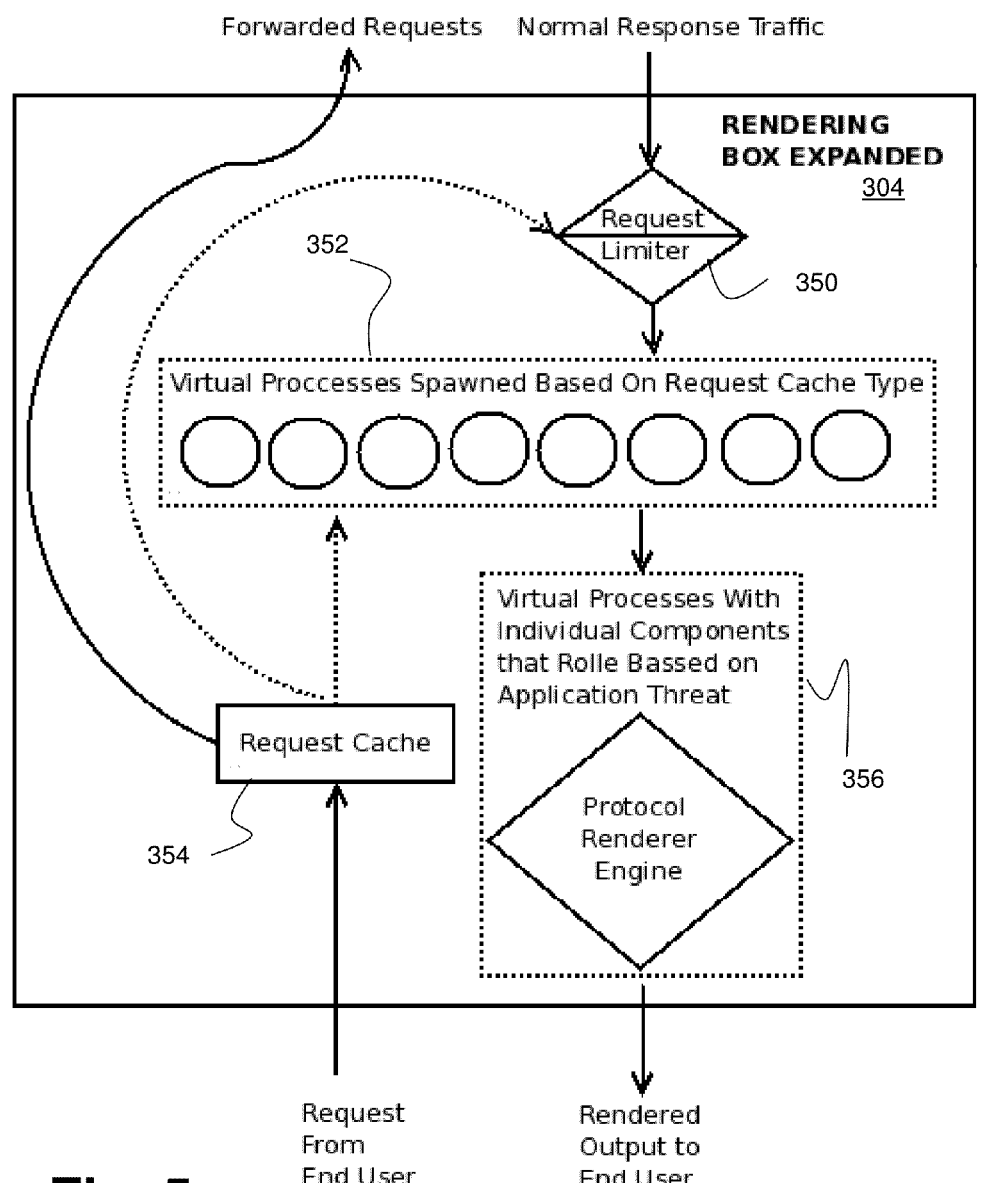
FIG. 5 is a schematic view of the rendering box component of the third embodiment system.

FIG. 4 shows system 300 including: external network 302; rendering box 304; end user network 306. As shown in FIG. 5, rendering box 304 includes request limiter module 350; virtual process spawning module (or "DAE") 352; request cache 354; and protocol rendering module 356.

As mentioned above, some embodiments of the present invention may actively attempt to identify and report malware as part of the process of rendering and/or recontainerization. However, this is not necessarily preferred. In some preferred embodiments of the present invention, the rendering and/or recontainerization does not attempt to identify malware, but rather will let any malware fall away naturally as an unused by-product of rendering and/or recontainerization of the initial state browser readable code set. These preferred embodiments of the present invention are therefore different than many currently conventional technologies which rely on detection of malware and/or of some anomaly that happened within the remote machine. At least some preferred embodiments of the present invention provide malware protection without detection Because security modules according to the present invention are expected to receive malware as part of the initial state browser readable code sets that they receive on behalf of users, the potential for malware to adversely affect the security module itself should be considered by system designers. As one preferred way of dealing with the problem of malware at the security module, the security module can be designed to frequently change all of the software running on the security module with a known good "image." If the security module becomes corrupted with malware, then this problem will be eliminated quickly when the next image change at the security module takes place. For example, if the image of the security module is changed after each "transaction," then there is no practical way for anything adverse to happen on a long term basis.

For example, a user's browser can place a request to the rendering engine. In response, the rendering engine spawns a single-use-only, specific-application machine in a dynamic application engine ("DAE"). Such spawning of single-use-only, application specific machines may be selective, which is to say only triggered by certain types of requests. The spawned single-use-only machines are preferably virtual and can be in the cloud, on ram, etc. These DAE machines request their slice of the information and then "die." The rendering engine then determines that, if information is of the type that contains executables, then the rendering machine itself rolls to a new image (or at least a portion of the render rolls into a new engine depending on the nature and/or extent of the executable code in the initial state browser readable code set).

System 300 of FIGS. 4 and 5 show an embodiment of the concepts expressed in the preceding couple of paragraphs. In system 300, the engine is a computer platform such as a Dell 2970 (the names "Dell" and/or "Dell 2970" may be subject to trademark rights in various jurisdictions throughout the world and are intended as references to specific product(s) and/or service(s) and not as generic references to a general type of product(s) and/or service(s)). Preferably, this computer platform includes multiple processors and suitable memory, and has at least two network interface cards.

FIGS. 4 and 5 show a simplified example of how the rending engine works to protect an end-user's system from potential incoming browser-based attacks. FIG. 5 is an expanded view of rendering box 304, showing some of its constituent modules. As shown in FIG. 5, request cache module 354 receives a normal browser based request made by an end user. The request cache module keeps a record of all requests made by all of the end user. It passes the request's associated cache details on to both request limiter module 350, and DAE 352. The requests themselves are then forwarded on to the internet.

At this point the end web-server has received the request and responded. The response is again intercepted and passed through rendering box 304. On its way back to the end user, the packets are put first through the request limiter module 350 which checks the responses against request cache module 354. If a packet contains anything other then what was requested, that packet is preferably dropped. In addition, if the packet contains protocols that the rendering engine doesn't support then that packet is preferably dropped.

Those packets that do make in through the conditions imposed by the request limiter module 350 are then forwarded on to DAE 352. The DAE has the job of spawning virtualized processes which are each defined by the type of application content that the end-user requested. For instance if a user visits a website containing flash video, the DAE would spawn machines for the flash content, javascript, and html (assuming all of these things are on the page requested). These machines are subject to attack based on the type of content that they deliver (see DEFINITIONS section entry for "attack-susceptible code"). Since specific protocols have specific vulnerabilities associated with them, a prediction can be made as to what will happen to the virtual machine if it is attacked. Thus the virtual application specific machines are monitored for changes based on this information. If a change is found in the on of the DAE-spawned machines that is considered a threat then the machine is preferably destroyed along with the packet. The determination of which changes in a virtual machine are considered as a threat will often be based on previous experience with virtual machines.

Those packets that do manage to pass through the DAE are assumed to be legitimate content and are passed on to the protocol rendering engine of protocol rendering module 356. This is the engine which renders the browser based traffic into its safest form and sends it onto the end user. This engine is preferably protected using a mechanism similar to the DAE in that it can rebuild the rendering machine as needed based on any change that it detects which is outside the predefined acceptable areas. Once traffic has passed through the protocol rendering module, it is now in a new repackaged form and is send on to the awaiting end-user system.

As a further variation on the present invention, interaction with third party secure certificates may be included as part of the remote rendering process.

As a further variation on the present invention, the rendering and/or recontainerization can be offered as a service from a third party, such that control and access is administered by the third party.

Figure 6:
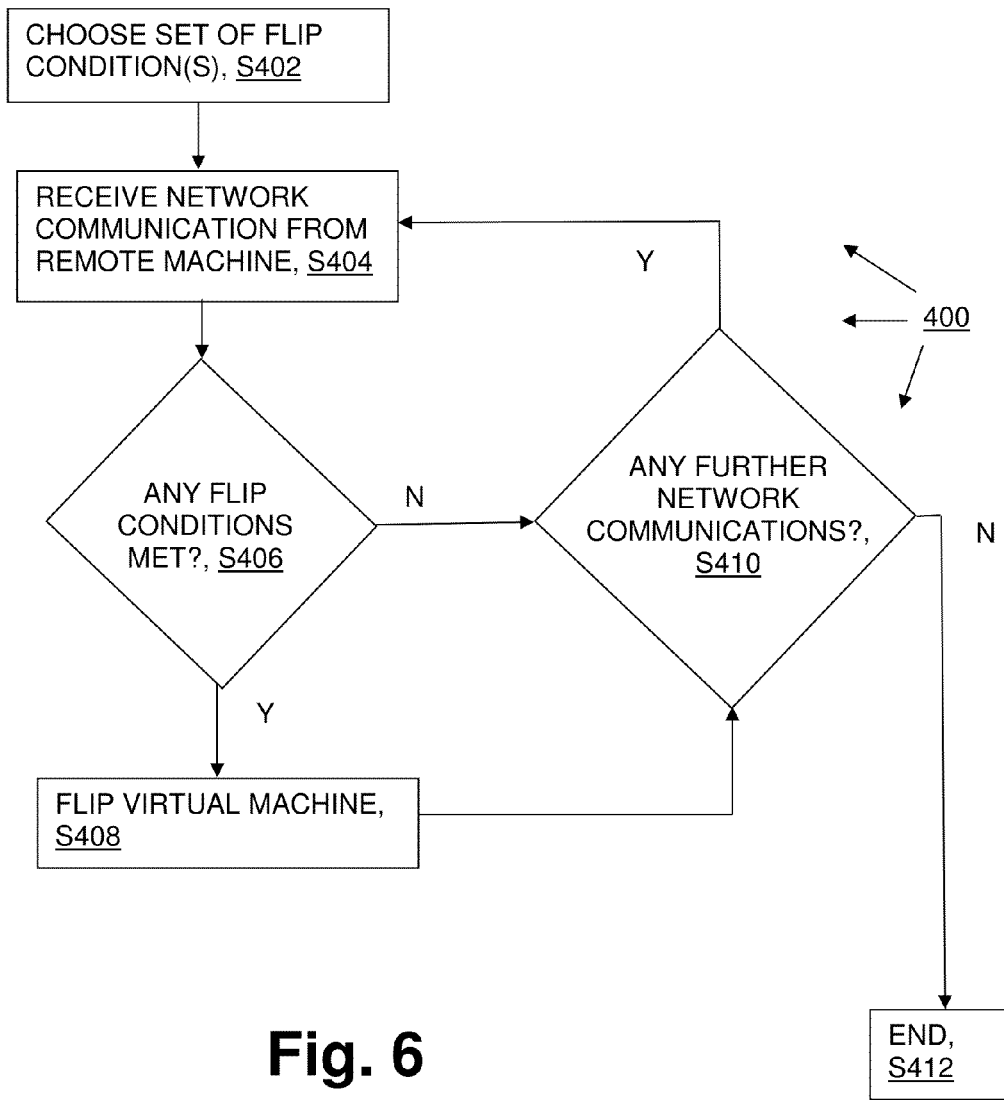
FIG. 6 is a flowchart showing a method according to the present invention.

FIG. 6 shows a flowchart for a method 400 according to an aspect of the present invention. This method may be used in connection with a rendering module that is separate from an end user's machine, as discussed above in connection with the system embodiment of FIGS. 4 and 5. On the other hand, method 400 could be implemented on the end user's machine, even in systems that do not include any sort of rendering module that is separate from the end user's machine. In embodiments where this method is used in connection with a separate rendering module the rendering module must be capable of supporting a virtual machine (see DEFINITIONS section). In embodiments where this method is used in connection with the end user's machine, the end user's machine must be capable of supporting a virtual machine.

In method 400, processing starts at step S402, where the conditions for flipping a virtual machine are determined and identified. These conditions are conditions that are likely to occur during normal network communication operation, and are not conditions that indicate anything abnormal in the performance or status of the virtual machine. Because the flip conditions are not designed to detect anything abnormal, the conditions will tend to be easier and faster to check than the checking that occurs in conventional systems that attempt to detect abnormal operations. Perhaps more importantly, because the flip conditions relate only to normal operations, these conditions do not require predictions about the nature of abnormal behavior or status that an abnormal condition may cause. This is important because malware is always evolving, and the abnormal behavior caused by future malware may not match the abnormal behavior caused by today's malware. However, when normal operating conditions cause a flip, there is no need to make predictions about what behavior might be indicative of malware that does not yet exist.

The set of flip conditions chosen at step 402 may simple be a single, predetermined, pre-programmed set of flip condition(s) that is always the same set of flip conditions no matter who or where the end user is and not susceptible to the concept of multiple security levels. In some preferred embodiments there will be multiple security levels, such that different sets of flip conditions are chosen depending upon some kind of selection criteria, such as the identity of the end user, the location of the end user and so on. For example, a low security level may flip only when a TCIP session changes, and a high security level may flip every time a full second has passed since the last flip.

Some normal operating conditions that may be chosen to be part of the set of flip condition(s) include, but are not limited to, the following: (i) TCIP session ends/new TCIP session begins; (ii) file download; (iii) network communication received from a predetermined website; (iv) network communication received from a website having some predetermined characteristic (for example, a network communication from a dot-xxx domain website); (v) a switch in network protocols (for example, a switch from SMTP to S-MIME); (vi) a switch in packet size or MTU (maximum transmission unit); (vii) passage of a predetermined amount to time since the last flip; and (viii) some predetermined volume of data flow since the last flip.

After the set of flip condition(s) has been determined at step S402, processing proceeds to step S404 where a network communicating is received. Processing then proceeds to step S406 where it is determined whether any of the flip conditions (of the set of flip condition(s) determined at step S402) have been met, If at least one flip condition has been met, then processing proceeds to step S408 where the virtual machine that has been processing the received network communications is flipped. In this way, if one of the previously received network communications contained malware, the adverse consequences of this received malware will be eliminated or at least reduced. If, at step S406, it is determined that no flip conditions have been met, then processing proceeds to step S410 where it is determined whether further network communications are to be received. If so, processing loops back to step S404. If not, processing proceeds to step S414.

The method of FIG. 6 could be practiced in the hardware/software systems of FIG. 1, 3 or 4, where there is one separate physical machine (for example, a computer) that renders and/or recontainerizes and another separate physical machine (for example, computer) that is the end user's machine with the end user's browser. The inventive method of FIG. 6 may also be practiced on network systems where a single physical machine (for example, an end user's desktop computer system) communicates with remote machines (for example, Internet web page servers) directly over a communication network (for example, the internet) without the intervention of intermediate machines. In these embodiments, the virtual machines and the software for flipping virtual machines would most likely reside and be executed right on the user's machine itself, but with the virtual machines providing a barrier that would prevent malware processed by the virtual machines from infecting real resources on the user's computer. These virtual machines used in the inventive method of FIG. 6 could take the form of native virtual machines (hypervisor running on the bare metal) or hosted virtual machine (hypervisor runs on top of operating system ("OS"). Even in a single machine embodiment, method 400 can provide protection without detection in the sense that the virtual machines will flip under normal operating conditions and (at least in preferred embodiments) do not need to try to detect any sort of abnormalities.

Now some comments regarding the flipping (or rolling) of virtual machines will be made to help show how this can be done. To help ensure uninterrupted service when rolling virtual machines, it is preferred that certain application specific parameters and/or data be passed between systems. Typically this is known as the "system heartbeat," and "application working memory." The system heartbeat is a pulse which is sent out from the primary (or precursor) virtual machine to the backup (or replacement) virtual machine, preferably at a regular interval. This pulse is used to notify the up/down state of the primary VM to the backup VM. The application working memory is data which is being processed by the application in RAM or on disk.

Applying these concepts of system heartbeat and application working memory to embodiments of the present invention having a security module with a flipping VM, consider that a user is visiting a simple, server-hosted website containing a single html-based page. The user's browser (local to the user) makes a request to the server computer, but the security module (generally not local to the user) intercepts the request and relays it to the server computer on the end-user's behalf. The resultant page is transmitted back to the gateway where it then is processed into a secure format (using the flipping virtual machine) and relayed along to the end-user's browser so that the presence and/or role of the security module is somewhat transparent (or at least unobtrusive) to the end user who enjoys the security that the security module provides her computer. In this example, the application is the secure rendering process and gateway relay processes. For uninterrupted service when the VM of the security module rolls, it will depend on which point within the entire scenario it takes place. If the VM rolls during relay of the request, then that request to be relayed will need to be passed on. If the VM rolls during the processing of the page then the returned data from the original website will need to be passed on to the backup VM, and so on.

DEFINITIONS

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Electrically Connected: means either directly electrically connected, or indirectly electrically connected, such that intervening elements are present; in an indirect electrical connection, the intervening elements may include inductors and/or transformers.

Remote: physically separate, but could be as close as in the same room.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Browser readable code: sufficiently encapsulated and/or formatted so that the data can be read and utilized by browser modules (for example, software based browsers) now known or to developed in the future.

Browser readable code set: the entire set of browser readable code included in a data communication to and through a browser; for example, xml is browser readable code, and a full xml web page with all associated data, including all CSS layers, would be considered as a browser readable code set.

Render and/or recontainerize: to take a set of data representing a visual and/or auditory presentation and to: (i) process it to the point where the data could be directly presented to as an auditory and/or visual presentation; and (ii) recompress and/or re-encapsulate the data so that it is included in a set of browser readable data; in some embodiments, the compression and/or format of the data before and after rendering and/or recontainerization (for example, a 400 pixels per inch jpg image may be rendered and/or recontainerized as a 400 pixels per inch jpg image); in other embodiments, the compression and/or formatting will change (for example, an uncompressed way audio file may be rendered and/or recontainerized as a 128 kpbs mp3 file).

attack-susceptible code: any browser readable code that is subject to malware attack based on the type of content that it has.

malware: any set of executable instructions (that is, software) communicated to a computer system over any sort of communication network that is designed to secretly access a computer system without the user's informed consent.

virtual machines: a software environment wherein all resources (for example, a process, transient storage, permanent storage) are emulated (that is, accomplished as a software implementation); virtual machines may be: (i) based entirely on a real machine, (ii) based partially on a real machine, or (iii) not at all based on a real machine; virtual machines are separated into two categories as follows: (i) a system virtual machine (or hardware virtual machine) provides a complete system platform which supports the execution of a complete operating system (OS), and (ii) a process virtual machine is designed to run a single program, which means that it supports a single process; a characteristic of a virtual machine is that the software running inside is at least substantially limited to the resources and abstractions provided by the virtual machine software—it cannot break out of its virtual world in any substantial way; the virtual machine may just be a dependency.

flipping (or rolling) a virtual machine: replacing an existing virtual machine with an identical virtual machine; when flipping: (i) both a precursor virtual machine and its replacement may overlap in their respective existences as the replacement is being made; (ii) the precursor virtual machine may be destroyed prior to its replacement being spawned; and/or (iii) the process of destroying the precursor virtual machine may temporally overlap the process of spawning the replacement virtual machine. computer system: may be distributed over multiple locations; a computer system at a single location is herein referred to as a localized computer system.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering (s) of the claimed steps is particularly mentioned or discussed in this document—in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. A method for connecting user browser software running on a user computer to the internet for the purposes of data communication with internet data sources, the method comprising the steps of:
providing a software rendering application that is: (i) remote from the user computer, and (ii) in data communication with the user computer;
issuing at least one command from the user browser software, the at least one command being intended for a target internet data source internet data sources;
intercepting, by the software rendering application, the at least one command before it reaches the target internet data source;
proxying, by the software rendering application, the at least one command;
receiving, by the software rendering application, responsive data comprising original user functionality through the internet from the target internet data source;
automatically rendering, by the software rendering application, all received responsive data into an interactive pixilated image as a layer defined by pixilated image data such that no original browser executable code will be executed at the user computer;
overlaying, by the software rendering application, the pixilated image data with a secure browser readable code set layer comprising at least one of a link, a fillable user input data field, an embedded video, or an embedded audio, wherein the browser readable code set includes the original user functionality of the responsive data; and
sending the browser readable code set from the software rendering application to the user browser software.

2. The method of claim 1 further comprising the steps of:
reading, by the user browser software, the pixilated image data; and
displaying, by the user computer, the pixilated image data on a display that is part of the user computer.

3. The method of claim 1 wherein:
the rendering step further comprises forming, based on the responsive data, an interactive overlay of the image that contains at least one form field; and
the encapsulating step further comprises encapsulating the interactive overlay of the image that contains at least one form field with the pixilated image data into the browser readable code set.

4. The method of claim 1 wherein:
the rendering step further comprises forming, based on the responsive data, a hyperlink; and
the encapsulating step further comprises encapsulating the hyperlink with the pixilated image data into the browser readable code set.

5. The method of claim 1 wherein:
the rendering step further comprises forming, based on the responsive data, a reconstructed video; and
the encapsulating step further comprises encapsulating the reconstructed video with the pixilated image data into the browser readable code set.

6. The method of claim 1 further comprising the step of interacting with third party secure certificates in the remote rendering process.

7. The method of claim 1 further comprising the steps of:
offering a service through a third party to provide the software rendering application; and
controlling access to the software rendering application by the third party.

8. A security module for use in a computer communication system including a communication network, a server computer sub-system and a user computer sub-system that includes a user browser module, the security module comprising:
a receive non-secure browser readable code set sub-module, wherein said receive non-secure browser readable code set sub-module is adapted to receive a non-secure browser readable code set comprising original user functionality from the server computer sub-system which is intended for the user computer browser module;
a render and/or recontainerize sub-module, wherein said render and/or recontainerize sub-module is adapted to automatically render and/or recontainerize all of the non-secure browser readable code set into an interactive pixilated image as a layer defined by pixilated image data with no original browser executable code will be executed at the user computer, and to form a secure browser readable code set layer corresponding to the non-secure browser readable code set, wherein the secure browser readable code set layer comprises at least one of a link, a fillable user input data field, an embedded video, or an embedded audio, and wherein the browser readable code set includes the original user functionality of the non-secure browser readable code set; and
a send secure browser readable code set sub-module, wherein said send secure browser readable code set sub-module is adapted to send the secure browser readable code set to the user browser module;
wherein:
the security module is remote from the server computer sub-system; and
the security module is remote from the user computer sub-system.

9. The security module of claim 8 wherein the receive non-secure browser readable code set sub-module, the render and/or recontainerize sub-module and the send secure browser readable code set sub-module are implemented by a virtual machine.

10. The security module of claim 9 wherein the receive non-secure browser readable code set sub-module, the render and/or recontainerize sub-module and the send secure browser readable code set sub-module are implemented by a process virtual machine.

11. The security module of claim 9 wherein the receive non-secure browser readable code set sub-module, the render and/or recontainerize sub-module and the send secure browser readable code set sub-module are implemented by a system virtual machine.

12. The security module of claim 9 further comprising a flip virtual machine sub-module is structured, connected and/or programmed to: (i) store a set of flipping conditions, including at least one flipping condition, and (ii) flip the virtual machine if any flipping condition from the set of flipping condition(s) are met.

13. The security module of claim 12 wherein:
the set of flipping conditions includes at least a first flipping condition; and
the first flipping condition is likely to occur during normal network communication operations and is not an indication that indicates anything abnormal in the operation of the virtual machine.

14. The security module of claim 12 wherein:
the set of flipping conditions includes at least a first flipping condition; and
the first flipping condition is based on operational state of the flow characteristics.

15. The method of claim 1, further comprising the following steps (not necessarily in the following order):
determining, by a computer system, a set of flip condition(s) comprising at least a first flip condition;
setting up a first virtual machine running on the computer system;
setting up a second virtual machine running on the computer system;
receiving, by the computer system, a plurality of network communications from at least one remote machine over a communication network;
processing, by the first virtual machine, at least some of the network communications received at the receiving step; and
evaluating whether any flip condition(s) in the set of flip condition(s) have been met;
flipping the first virtual machine to a second virtual machine on condition that it is determined that at least one flip condition is met at the evaluating step;
wherein the first flipping condition is likely to occur during normal network communication operations and is not an indication that indicates anything abnormal in the operation of the virtual machine.

16. The method of claim 15 wherein the first flipping condition is based on operational state of the flow characteristics.

17. The method of claim 15 wherein the first flipping condition is that a TCIP session ends and a new TCIP session begins.

18. The method of claim 15 wherein the first flipping condition is based upon the occurrence of a file download.

19. The method of claim 15 wherein the first flipping condition is that a network communication is received from a predetermined website.

20. The method of claim 15 wherein the first flipping condition is one of the following conditions: (i) network communication received from a website having some predetermined characteristic, (ii) a switch in network protocols, (iii) a switch in packet size or MTU (maximum transmission unit); (iv) passage of a predetermined amount to time since the setting up of the first virtual machine; or (v) some predetermined volume of data flow since the setting up of the first virtual machine.

* * * * *